(12) United States Patent
Schlegel et al.

(10) Patent No.: US 9,634,442 B2
(45) Date of Patent: Apr. 25, 2017

(54) SYSTEM OF PLUG CONNECTORS FIXED ON MOUNTING RAILS

(75) Inventors: Bernard Schlegel, Rahden (DE);
Andreas Nass, Warmsen (DE);
Sebastian Griepenstroh, Rahden (DE);
Stefan Garske, Osnabrueck (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 726 days.

(21) Appl. No.: 14/001,739

(22) PCT Filed: Jan. 19, 2012

(86) PCT No.: PCT/DE2012/100011
§ 371 (c)(1),
(2), (4) Date: Aug. 27, 2013

(87) PCT Pub. No.: WO2012/116691
PCT Pub. Date: Sep. 7, 2012

(65) Prior Publication Data
US 2016/0149356 A1 May 26, 2016

(30) Foreign Application Priority Data
Mar. 3, 2011 (DE) .................... 10 2011 001 069.6

(51) Int. Cl.
*H01R 13/73* (2006.01)
*H01R 13/514* (2006.01)
*G02B 6/38* (2006.01)

(52) U.S. Cl.
CPC .......... *H01R 13/73* (2013.01); *H01R 13/514* (2013.01); *G02B 6/3897* (2013.01)

(58) Field of Classification Search
CPC .. H01R 9/26; H01R 13/518; H01R 13/62905; H01R 13/62938; H01R 13/631; H01R 9/2608; H05K 7/1409
See application file for complete search history.

(56) References Cited

U.S. PATENT DOCUMENTS

| | | | |
|---|---|---|---|
| 2,993,187 A * | 7/1961 | Bisbing | H05K 7/1409 361/801 |
| 3,476,258 A * | 11/1969 | Dorsett | H05K 7/1409 211/41.17 |
| 3,824,553 A * | 7/1974 | Glover | H01R 9/26 439/281 |

(Continued)

FOREIGN PATENT DOCUMENTS

| | | |
|---|---|---|
| DE | 4042060 | 6/1992 |
| DE | 69623368 | 6/2003 |

(Continued)

*Primary Examiner* — Bradley Duckworth
(74) *Attorney, Agent, or Firm* — Jacobson Holman, PLLC.

(57) ABSTRACT

A latching device for a first system of plug connectors, which are fastened to a first mounting rail, and a second system of plug connectors, which are fastened to a second mounting rail, includes a passive latching part and an active latching part. When the active latching part is latched to the passive latching part, the first mounting rail and the second mounting rail are connected to each other, and the plug connectors located on the first mounting rail and the second mounting rail are brought into contact with each other.

10 Claims, 4 Drawing Sheets

(56) References Cited

U.S. PATENT DOCUMENTS

| | | | | |
|---|---|---|---|---|
| 5,035,634 | A | * | 7/1991 | Hasircoglu ...... H01R 13/62972 |
| | | | | 439/157 |
| 5,151,041 | A | | 9/1992 | Kaiser et al. |
| 5,795,174 | A | | 8/1998 | Saito et al. |
| 6,146,213 | A | * | 11/2000 | Yoon .................... H01R 9/2616 |
| | | | | 439/532 |
| 6,932,513 | B2 | * | 8/2005 | Kahle .................. G02B 6/3897 |
| | | | | 385/55 |
| 9,192,537 | B2 | * | 11/2015 | Schlegel .............. H01R 13/518 |
| 2007/0254520 | A1 | | 11/2007 | Niggemann et al. |
| 2008/0014799 | A1 | | 1/2008 | Nolting et al. |
| 2009/0290845 | A1 | | 11/2009 | Hoffmann |

FOREIGN PATENT DOCUMENTS

| | | |
|---|---|---|
| DE | 202008006934 | 7/2008 |
| KR | 1020130133013 | 12/2013 |
| RU | 2277252 | 5/2006 |

\* cited by examiner

SYSTEM OF PLUG CONNECTORS FIXED ON MOUNTING RAILS

CROSS-REFERENCE TO RELATED APPLICATIONS

This is a national stage of PCT/DE12/100011 filed Jan 19, 2012 and published in German, which has a priority of German no. 10 2011 001 069.3 filed Mar 3, 2011, hereby incorporated by reference.

BACKGROUND OF THE INVENTION

1. Field of the Invention

The invention relates to a locking device for a first system of plug connectors with a second system of plug connectors, with each of the first system of plug connectors and the second system of plug connectors and the second system of plug connectors being connectable to a respective mounting rail.

These types of locking devices are necessary to prevent an inadvertent break in contact between systems of plug connectors in contact with each other.

2. Description of the Prior Art

DE 20 2008 006 934 U1 shows a plug connector for optical fibers. Each housing body has only one contacting element and can be strung together with others such that pins structured into one housing body fit into matching recesses of a neighboring housing body. The strung out plug connectors form a system of plug connectors.

KR1020060091923 A shows a system of plug connectors that are strung together on a mounting rail. The individual plug connectors are not connected to each other. The mounting rail is closed on both sides by a locking element. The locking element ensures that the plug connectors cannot be pushed off the mounting rail.

KR1020060091923 A does not show how the system of plug connectors can be connected to a system of mating plugs which are also located on a mounting rail.

SUMMARY OF THE INVENTION

The problem for the invention is to suggest a locking device for a system of plug connectors that enables a simple contacting of systems of plug connectors with each other.

The problem is solved by the characteristics of the system of plug connectors fixed on mounting rails as described herein.

Advantageous configurations of the invention are given in the sub-claims.

The system of plug connectors, as per the invention, consists of a row of plug connectors coupled with each other and which are together fixed onto a mounting rail.

The individual plug connectors are surrounded by a housing body.

Advantageously, the housing body is constructed in one piece. This can be achieved through known plastic injection molding techniques—in case of a plastic housing—or through known zinc pressure casting processes—in the case of a metallic housing.

It is also possible to construct the housing body out of a composite material, for instance out of a combination of metal and plastic.

A holding cage is snapped-in securely within the housing body.

The holding cage is essentially fashioned as a hollow cylinder. On one end, the holding cage has two arms pointing in the axial direction, which grasp securely around a contact element. At the other end, the holding cage grasps the cable sheath of a cable that is to be connected to the plug connector. One conductor of the cable is connected to the contact element by means of a crimp connector.

Coupling elements have been provided on both sides of the outside of the housing body which enable it to couple two or more plug connectors with similar housing bodies with one another.

Preferably, one coupling element is shaped like an arch-shaped groove and the other coupling element like a cylindrical pin. The cylindrical pin of one of the housing bodies is meant to be introduced into the arch-shaped groove of the similar housing body that is to be coupled. Thus, several plug connectors with similar housing bodies can be strung in a row.

When stringing in a row, only the housing bodies have to be similar. The internals of the plug connectors can be quite different. Thus, for instance, multi-poled electrical plug connectors can be combined with single-poled optical-fiber plug connectors. As a result, a high modularity of a plug connector arrangement can be achieved. A plug connector arrangement is also known as a system of plug connectors.

Additionally, fixing jigs have been provided on the outside of the housing bodies which enable the plug connectors to be fixed to a mounting rail, for example a top-hat rail.

The plug connectors can be coupled to each other by means of the coupling elements and additionally be fixed securely onto a mounting rail.

The fixing jigs consist of a combination of fixing lugs and spring pins. The fixing lugs are arranged axially and attach to a collar on the mounting rail. The fixing lugs are flexible and can deflect initially when snapping onto the mounting rail, before they snap-on behind another collar of the mounting rail.

The plug connector is completed by a cable gland that provides strain relief to the cable and serves to seal the housing body against media like dust and water.

If a desired number of plug connectors are in a row on a mounting rail, this is known as a system of plug connectors.

To connect two systems of plug connectors with one another, the mounting rails on which the systems are fixed must be joined together. This is implemented by means of a locking device which connects the individual mounting rails securely with one another, so that also the plug connectors opposite these can be connected with one another.

The locking device consists of a passive locking part and an active locking part. The active part has the locking elements with which the passive locking parts are attached to the active locking part.

When locking the active with the passive locking part, the mounting rails of the systems of plug connectors are brought together and joined with one another. Further, the individual plug connectors lying opposite each other are contacted with each other.

Advantageously, the locking elements of the passive locking part form a knee action lock. Thereby, a particularly stable lock is achieved.

To facilitate the joining of the two mounting rails, the locking device has a guide way. The guide way consists of a bolt on the active locking part which is guided into an opening intended for this purpose in the passive locking part.

The passive locking part has fixing jigs on both sides, with which a mounting rail can be fixed. Thus, two mounting rails can be arranged, statically stable, over one another—that is horizontally separated from each another. Due to the coupling of the passive with the active locking part with each another, connected systems of plug connectors can be arranged separated horizontally and in a statically stable manner. By means of the locking device, many systems of plug connectors can be arranged over one another to build what are known as plug-connector-arrays.

BRIEF DESCRIPTION OF THE DRAWINGS

An example of an execution of the invention is shown in the drawings and will be elaborated below. Shown is.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
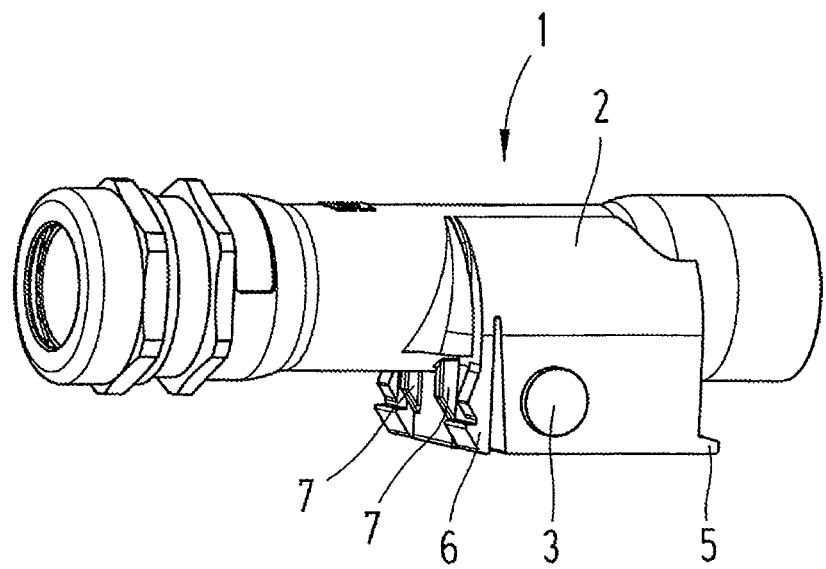
FIG. 1 a perspective presentation of a plug connector.
Figure 2:
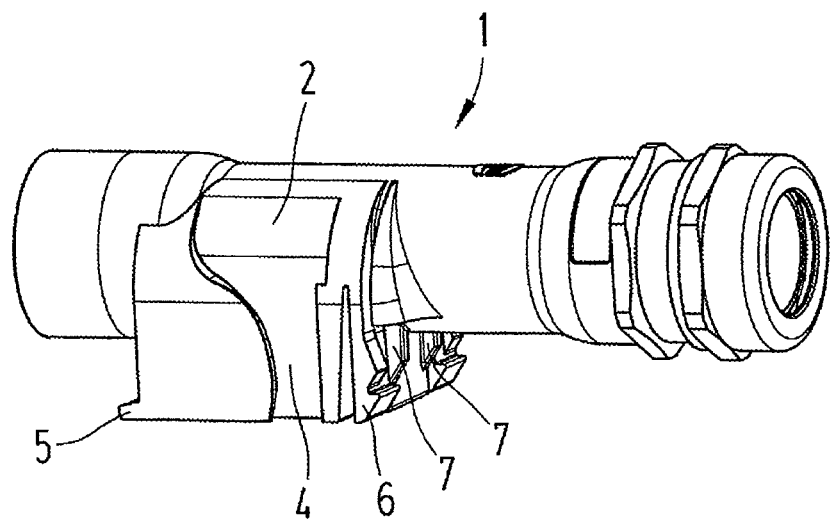
FIG. 2 another perspective presentation of the plug connector.

The FIGS. 1 and 2 show perspective representations of an example of an execution of the plug connector as per the invention. The invention is, however, not restricted to the example of execution shown here.

Figure 3:
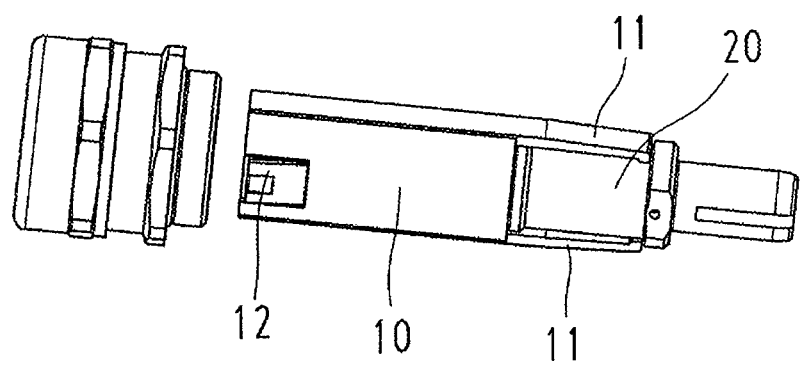
FIG. 3 a perspective presentation of the plug connector without base body.

The plug connector 1 is surrounded by a base body 2. Inside the hollow base body 2, there is a holding cage 10, snapped-in securely. FIG. 3 shows the plug connector 1 without base body 2. The holding cage 10 has snap-on elements 12 at one end, which mesh with matching undercuts (not shown) within the base body and thus fix the holding cage 10 in the base body 2. The cable sheath of the connecting cable (not shown) also penetrates into the holding cage also at this end.

At the other end, the holding cage has arms 11, which grip around the contacting element 20. Due to this, the contacting element 20 is fixed along the axial symmetry axis in the base body 2.

As already mentioned above, the opposite end of the holding cage 10 is penetrated by the cable sheath of the connecting cable. The conductor of the connecting cable is crimped onto the contacting element 20.

Figure 4:
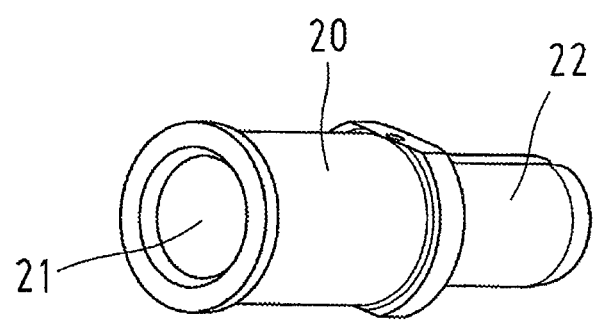
FIG. 4 a perspective presentation of a contacting element.
Figure 5:
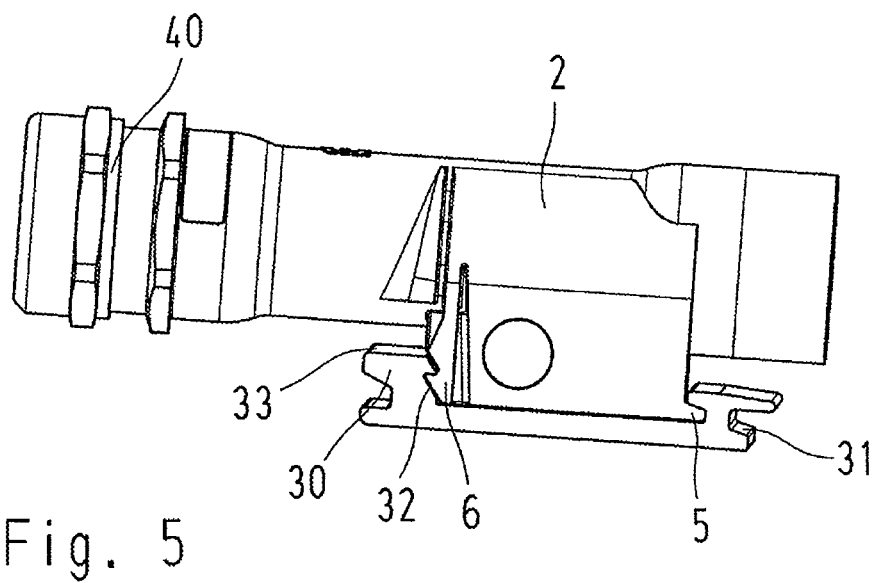
FIG. 5 a side view of a plug connector mounted on a mounting rail.

FIG. 4 shows a perspective representation of the contacting element 20. On one side, the contacting element 20 has a crimp opening 21 for taking up the conductor of the cable, that is to be connected. The other side of the contacting element 20 is fashioned in this example as a contact pin 22. It can, however, also be a fashioned as a socket contact.

The invention is not restricted to single contact plug connectors. The contacting element 20 can also have several crimp openings 21 and contacts 22 for the purpose of connecting multi core cables.

The base body 22 surrounds a cylindrical pin 3 on one side and on the opposite side, an arch-shaped groove 4. The pin 3 of a plug connector 1 is capable of being inserted in the groove 4 of another plug connector 1. Thus, several plug connectors 1 can be strung out in a row or coupled with one another. When a desired number of plug connectors is arrived at, one refers to this as a system of plug connectors 1, 1'.

Fixing lugs 5 and spring pins 6 are additionally provided on the base body 2, which together facilitate the reversible fixing of the plug connector 1 on a mounting rail 30. The fixing lugs 5 grip in the undercuts 31 of the mounting rail 30. While flipping down the plug connector 1 in the direction of the mounting rail 30, the spring pins are first bent back by a beveled ring 33, which then grip onto another undercut 32 of the mounting rail 30.

The base body 2, further surrounds supporting contours 7, which prevent the force resulting from a movement of the plug connector 1 on the mounting rail 30 in the plugging direction, being fully imposed on the spring pins.

The plug connector 1 is equipped with a cable gland 40, which is generally known state-of-the-art, and will not be discussed in detail here. The cable gland 40 is meant to act as a strain relief for the connecting cable and for sealing the base body 2 against media such as dust and water.

Figure 6:
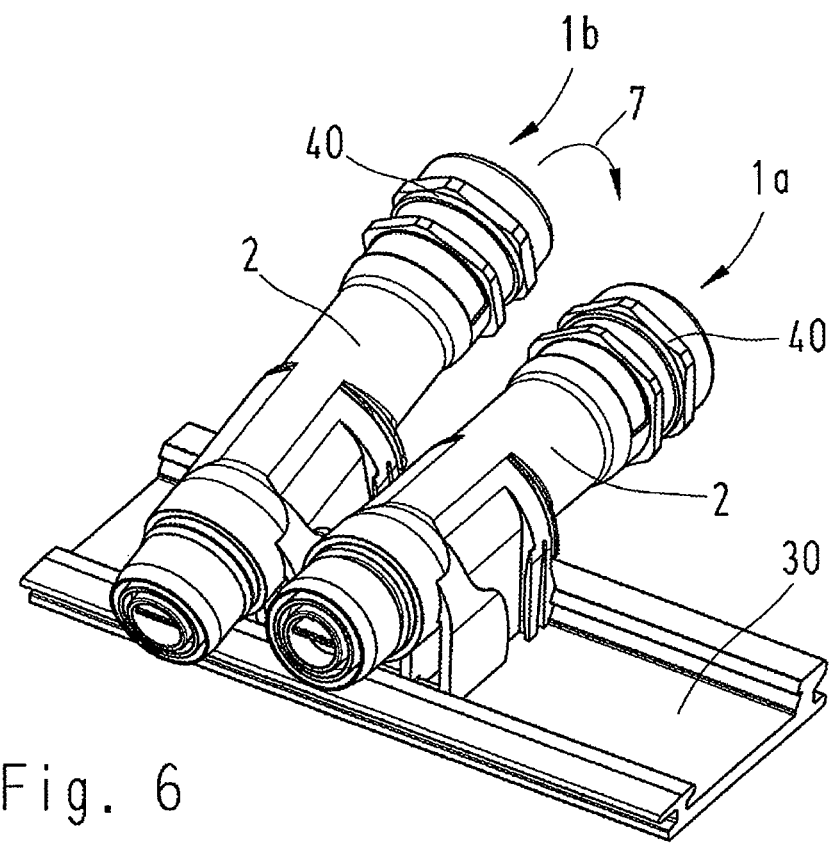
FIG. 6 a perspective presentation of two plug connectors during a coupling process, FIG. 7 a perspective view of two plug connector systems connected to each other and FIG. 8 a side view of the locking device.

FIG. 6 shows the coupling procedure of two plug connectors on the mounting rail 30. One plug connector 1a is already fixed on the mounting rail. The fixing lugs 5 of the plug connector 1b that is to be connected to it are first placed in the undercut 31. The plug connector 1b can then be moved in the direction of the arrow 7, towards the mounting rail 30. The arch-shaped groove of the plug connector 1b grips behind the cylindrical pin 3 of plug connector 1a. Because of the arched shape of the groove 4, the plug connector 1b can be moved in the direction of the arrow 7. Finally, as described above, the spring pins snap into the undercut 32 of the mounting rail 30. The plug connectors 1 a and 1b are coupled with one another as well as fixed on the mounting rail 30.

Exactly the reverse procedure is followed when uncoupling a plug connector from a modular system of plug connectors. The spring pins 6 must first be manually pressed out of the undercut 32. The plug connector can subsequently be disengaged in the opposite direction to arrow 7 from the neighboring plug connector and the mounting rail 30.

Figure 8:
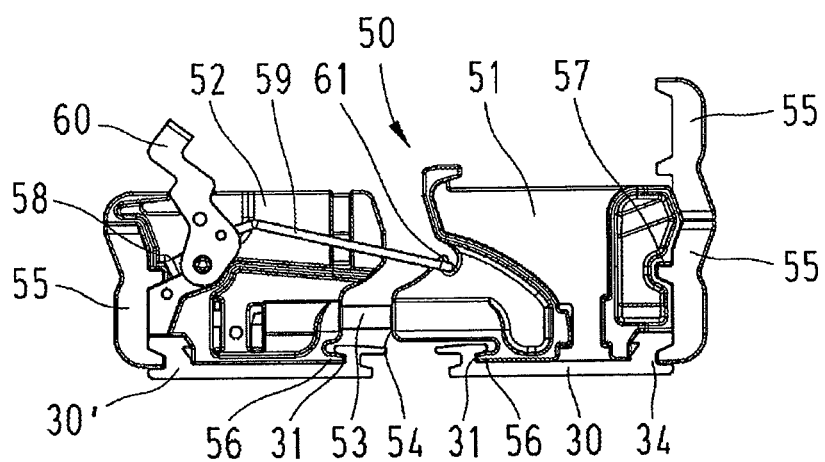

FIG. 8 shows the side view of a locking device 50. The locking device 50 consists of a passive locking part 51 and an active locking part 52.

The active 52 as well as the passive locking part 51 have lugs 56 that can be introduced into undercuts 31 of the mounting rail 30. Both locking parts 51, 52, can be fixed on to the relevant mounting rail 30, 30' with the help of a connector 55. The connector 55 grips simultaneously into a notch 57, 58 of the locking part 51, 52 and into rear groove 34 of the mounting rail 30.

A guide way is provided for easy joining of locking parts 51, 52. The passive locking part 51 surrounds an opening 54, in which a bolt 53 of the active locking part 52 can be inserted.

The locking of both locking parts 51, 52 is achieved through a tensioning spring 59 attached to the locking part 52, which is connected to a tensioning lever 60 (also attached to the active locking part 52). The tensioning spring 59 is placed over a tensioning lug 61 of the passive locking part 51. By actuating the tensioning lug 60, both the locking parts 51, 52 are reversibly joined to each other. The combination of tensioning lug 61, tensioning spring 59 and tensioning lever 60 works on the principle of knee lever action and thereby simultaneously ensures a particularly stable coupling of locking parts 51, 52 and the plug connectors 1, 1' in contact with each other. Furthermore, the knee lever action supports the unlocking procedure.

Figure 7:
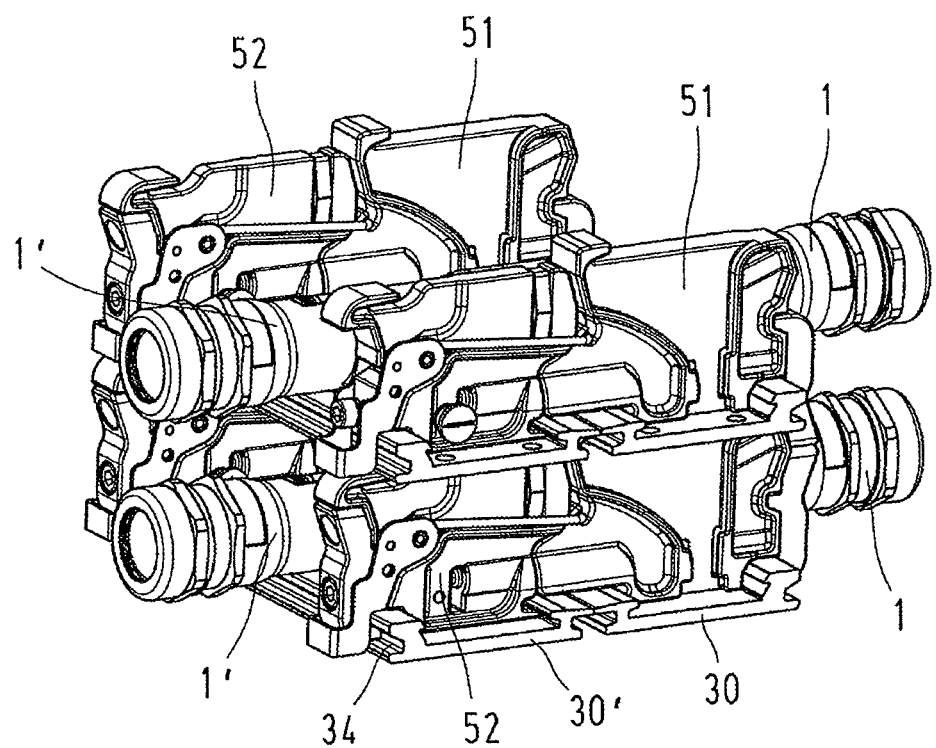

FIG. 7 shows several levels of systems of plug connectors 1, 1'. Two systems of plug contactors lying opposite each other are in contact with each other over the locking device 50. A mounting rail 30, 30' can be fixed on both sides of the locking device 50. Thus, several systems of plug connectors 1, 1' can be arranged equally spaced from each other.

The invention being thus described, it will be apparent that the same may be varied in many ways, Such variations are not to be regarded as a departure from the spirit and scope of the invention, and all such modifications as would be recognized by one skilled in the art are intended to he included within the scope of the following claims.

List of Reference Numbers
System of Plug Connectors

| | | | |
|---|---|---|---|
| 1 | Plug connector | 10 | Holding cage |
| 2 | Base body | 11 | Arm |
| 3 | Cylindrical pin | 12 | Snap-in element |
| 4 | Arch-shaped groove | 13 | |
| 5 | Fixing lugs | 14 | |
| 6 | Spring pins | 20 | Contacting element |
| 7 | Supporting contour | 21 | Crimp opening |
| 30 | Mounting rail | 50 | Locking device |
| 31 | Undercut | 51 | Passive locking part |
| 32 | Undercut | 52 | Active locking part |
| 33 | Ring | 53 | Bolt |
| 34 | Groove | 54 | Opening |
| 40 | Cable gland | 55 | Connector |
| | | 56 | Lug |
| | | 57 | Notch |
| | | 58 | Notch |
| | | 59 | Tensioning spring |
| | | 60 | Tensioning lever |
| | | 61 | Tensioning lug |
| | | 62 | |

What is claimed is:

1. A locking device for a system of plug connectors, which are fixed on a first mounting rail, and a second system of plug connectors, which are fixed on a second mounting rail, said locking device comprising:
passive locking part and an active locking part, configured such that while locking the active locking part with the passive locking part, a first pair of the first and the second mounting rail are joined to each other,
with another pair of the first and the second mounting rail being fixable on at least one of a top side and a bottom side of the active locking part and the passive locking part
such that the first pair of the first and the second mounting rail and the another pair of the first and the second mounting rail are arranged so as to be vertically spaced from each other, and
with the plug connectors located on the first pair of the first and the second mounting rail, and on the another pair of the first and the second mounting rail, being in respective contact with each other.

2. The locking device according to claim l, wherein the passive locking part is coupleable with the active locking part by action of a knee lever.

3. The locking device according to claim 1, wherein the active locking part includes a bolt and the passive locking part includes an opening, such that during a locking procedure, the bolt is insertable into the opening.

4. A locking device for a plug connector associated with a first mounting rail, and a plug connector associated with a second mounting rail, said locking device comprising:
an active locking part, a passive locking part, and a connector,
the active locking part being engageable with the first mounting rail,
the passive locking part being engageable with the second mounting rail, and
the connector being engageable with the first mounting rail, the active locking part, the second mounting rail, and the passive locking part,
configured such that with the active locking part engaged with the passive locking part, the first mounting rail and the second mounting rail are secured to each other, and the plug connector associated with the first mounting rail and the plug connector associated with the second mounting rail are in contact with each other,
the active locking part having a first surface and a second surface, and the passive locking part having a first surface and a second surface,
the active locking part first surface being engageable with the first mounting rail, and the passive locking part first surface being engageable with the second mounting rail, and
the active locking part second surface being engageable with a third mounting rail, and the passive locking part second surface being engageable with a fourth mounting rail.

5. The locking device according to claim 4, wherein a plurality of the plug connectors is associated with the first mounting rail, and a plurality of the plug connectors is associated with the second mounting rail.

6. The locking device according to claim 4, wherein the connector engages the third mounting rail and the fourth mounting rail.

7. The locking device according to claim 6, wherein the third mounting rail engages a second active locking part, the fourth mounting rail engages a second passive locking part, and the connector engages the second active locking part and the second passive locking part.

8. The locking device according to claim 7, wherein the second active locking part, the third mounting rail, the second passive locking part, and the fourth mounting rail are vertically disposed relative to the active locking part, the first mounting rail, the passive locking part, and the second mounting rail.

9. A plug connector array comprising:
a stacked plurality of systems of plug connectors, with each of said systems including a locking device for a first assembly of plug connectors, which are fixed on a first mounting rail, and a second assembly of plug connectors, which are fixed on a second mounting rail, the locking device including
a passive locking part and an active locking part configured such that while locking the passive locking part with the active locking part, a first pair of the first and the second mounting rails are joined to each other,
with another pair of the first and the second mounting rails being fixable on at least one of a top side and a bottom side of the active locking part and the passive locking part such that the first pair of the first and the second mounting rails and the another pair of the first and the second mounting rails are arranged so as to be vertically spaced from each other, and
with the first assembly and the second assembly of plug connectors located on the first pair of the first and the second mounting rails, and on the another pair of the first and the second mounting rails, being in respective contact with each other.

10. The plug connector array according to claim 9, wherein the plurality of systems of plug connectors is vertically stacked.

* * * * *